Nov. 8, 1932.    A. B. CHARROIN    1,887,194
POWDER PUFF AND METHOD OF MAKING THE SAME
Filed Aug. 12, 1930    2 Sheets-Sheet 1

INVENTOR.
ARTHUR B CHARROIN
BY A. B. Bowman
ATTORNEY

Nov. 8, 1932.  A. B. CHARROIN  1,887,194

POWDER PUFF AND METHOD OF MAKING THE SAME

Filed Aug. 12, 1930  2 Sheets-Sheet 2

INVENTOR.
ARTHUR B. CHARROIN
BY A. B. Bowman
ATTORNEY

Patented Nov. 8, 1932

1,887,194

UNITED STATES PATENT OFFICE

ARTHUR B. CHARROIN, OF SAN DIEGO, CALIFORNIA

POWDER PUFF AND METHOD OF MAKING THE SAME

Application filed August 12, 1930. Serial No. 474,726.

My invention relates to powder puffs, and a method of making the same, and the objects of my invention are:

First, to provide a powder puff and a method of making the same, in which hand-sewed seams are eliminated;

Second, to provide a powder puff in which the slit or opening required in order that the powder puff may be turned right side out is located on one side of the powder puff whereby an ornamentation may be fastened thereover;

Third, to provide a powder puff which is economical of manufacturing as well as attractive in appearance;

Fourth, to provide a method of making powder puffs whereby skilled handwork is reduced to a minimum;

Fifth, to provide a method of making powder puffs in which the padding therein may be readily and quickly positioned uniformly;

Sixth, to provide on the whole a novel method of producing or making a powder puff in which the steps are simple, few in number, and readily performed; and Seventh, to provide on the whole a novel powder puff which is efficient in its action and which will not readily deteriorate.

Figure 1:
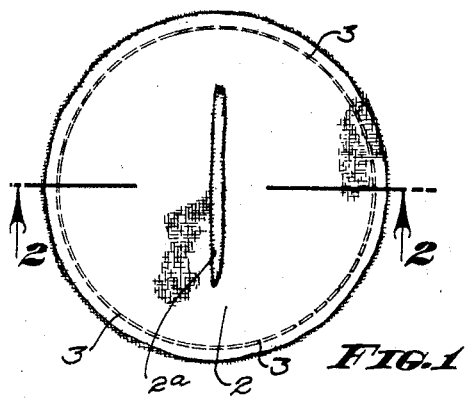
Figure 3:
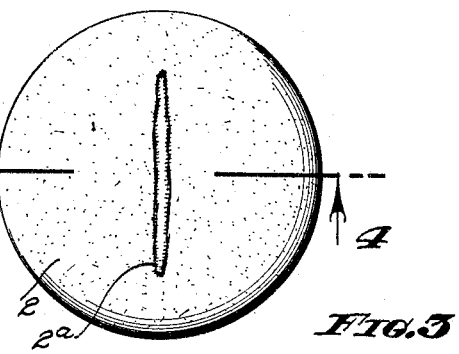
Figure 2:
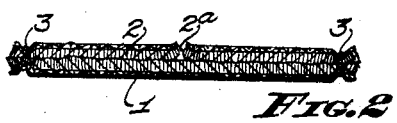
Figure 4:
Figure 5:
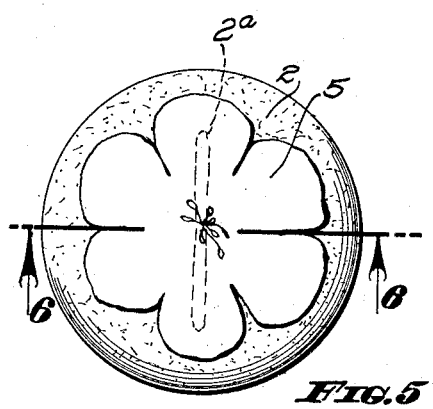
Figure 6:
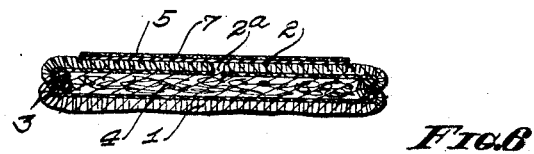
Figure 9:
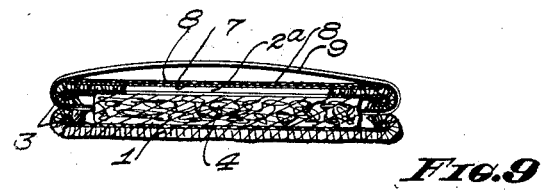
Figure 7:
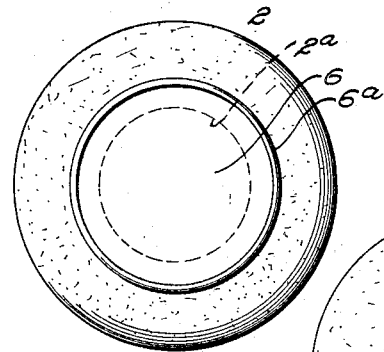
Figure 8:
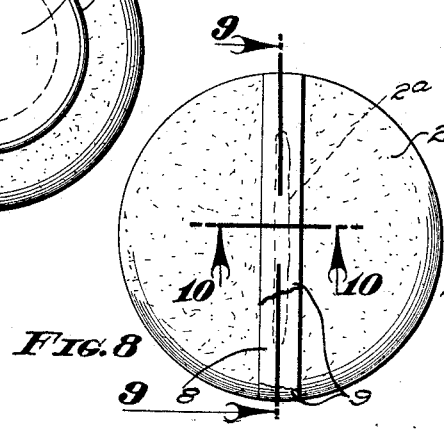
Figure 10:
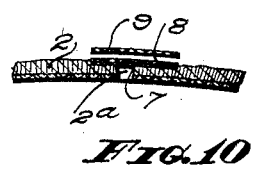
Figure 12:
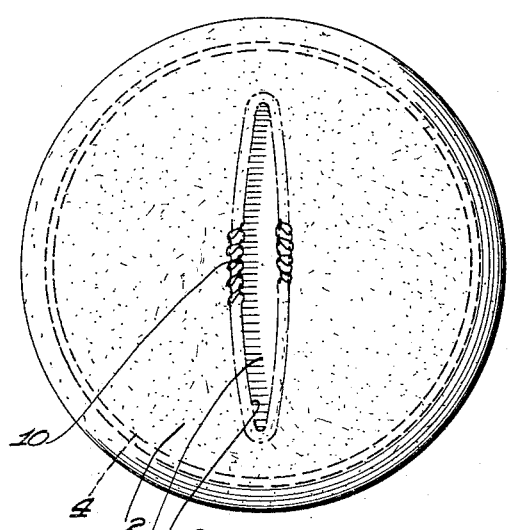
Figure 11:
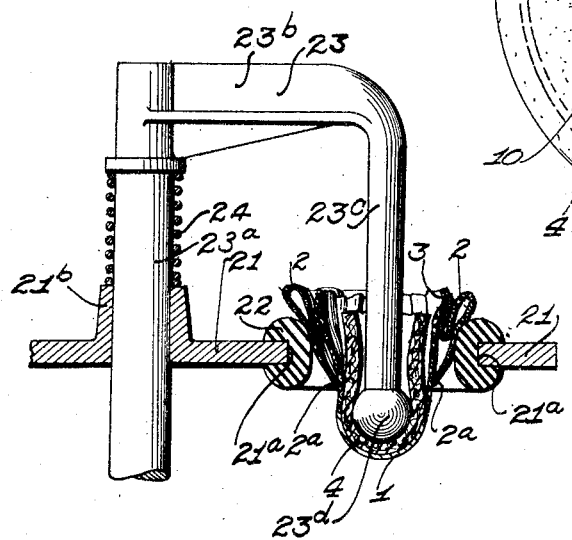
Figure 13:
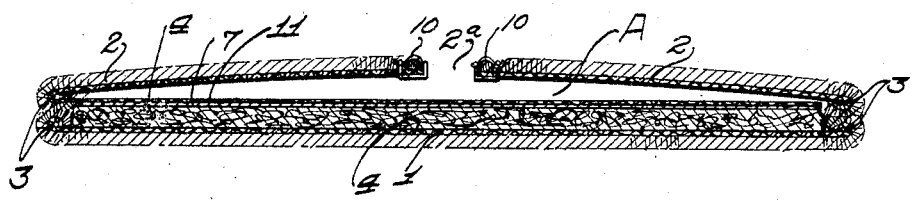

With these and other objects in view as will appear hereinafter, my invention consists of certain novel features of construction, combination and arrangement of parts and portions as will be hereinafter described and a method of producing the same as will be hereinafter described in detail and particularly set forth in the appended claims, reference being had to the accompanying drawings and to the characters of reference thereon, which form a part of this application, in which:

Figure 1 is a plan view of the powder puff after the blanks are sewed together wrong sides out, showing the slit or opening which enables them to be turned right side out; Fig. 2 is a sectional view thereof through 2—2 of Fig. 1; Fig. 3 is a plan view of the powder puff after being turned right side out and before the opening is covered; Fig. 4 is a sectional view thereof through 4—4 of Fig. 3; Fig. 5 is a plan view of a completed powder puff in one form; Fig. 6 is a sectional view through 6—6 of Fig. 5; Fig. 7 is a plan view of the completed powder puff in another form in which a mirror covers the opening; Fig. 8 is a plan view of another form of my powder puff with parts and portions broken away; Fig. 9 is a sectional view thereof through 9—9 of Fig. 8; Fig. 10 is an enlarged fragmentary sectional view through 10—10 of Fig. 8; Fig. 11 is a substantially diagrammatical view of a machine for turning the powder puff right side out with a powder puff partially turned and in section; Fig. 12 is a plan view of another form of my powder puff; and Fig. 13 is an enlarged sectional view thereof through 13—13 of Fig. 12.

Similar characters of reference refer to similar parts and portions throughout the several views of the drawings.

The principal parts and portions of my powder puff in the various forms illustrated comprise a base or bottom member 1, a top member 2, stitching 3, a filler or padding 4, an ornament 5 or 6, adhesive 7, cover strap 8, supporting strap 9, filler covering 10, and edging 11.

The bottom member 1 and top member 2 are preferably circular and of equal size. They are formed of the type of cloth usually used for powder puffs; that is, cloth having a soft nap. The top member is provided with an opening 2a, which is preferably a slit, as shown best in Figs. 1, 3, 5, and 12. However, the opening may be circular as shown by dotted lines in Fig. 7. The opening or slit 2a is preferably centered on the top member 2.

The two members 1 and 2 are secured together wrong side out by a circular stitching 3, which may be easily done by a sewing machine, and which extends entirely around the margin of the top and bottom members, as shown best in Fig. 1.

After the stitching, the bottom and top members are turned right side out through the slit 2a. This can be readily done by a machine such as shown in Fig. 11. In this machine there is provided a table 21 in which is a round opening 21a, the margins of which support a ring 22, preferably of rubber. A sleeve 21b having a vertical axis, is provided in the table 21. Slidably mounted in this sleeve is a shaft portion 23a of a plunger member 23. A horizontal portion 23b extends forwardly from the shaft 23a into centered relation and above the ring 22.

A plunger arm 23c extends downwardly from this horizontal portion, and is provided with a knob 23d at its lower extremity. The shaft is connected with any suitable mechanism, such as a foot lever, not shown, for depressing the plunger arm so as to cause the plunger to pass through the ring 22. A spring 24 may be used to return the plunger to normal or upper position.

The stitched bottom and top members in the form shown in Fig. 1 are placed top side down over the ring 22, that is, with top member 2 having the slit 2a on the lower side. A filler or padding member 4 is placed on top of the bottom member. The filler is formed of cotton or the like and is slightly smaller in diameter than the bottom member. The plunger arm 23c is then moved downwardly forcing the bottom member and padding through the slit 2a. The ring 22 is made small enough so that the friction between it and the top member is sufficient to prevent the powder puff from falling through the ring until right side out. When the powder puff is once right side out, further movement of the plunger forces the powder puff through the ring into a hopper or the like, not shown, positioned below. After being turned right side out, the powder puff appears as in Figs. 3 and 4. The slit may be covered with an ornament such as an artificial flower, or the like, 5, or a small mirror 6, as shown in Figs. 5 and 7. The ornament is fastened by glue or other adhesive 7, as indicated in Fig. 6. In the case of the mirror, it is best to provide a backing upon it which fits over the margins of the mirror, as indicated by 6a, so as not to require the silvering to support the mirror.

In the construction shown in Figs. 8, 9, and 10, a pair of superposed, diametrically arranged straps 8 and 9 are sewed by their ends between the bottom and top members. Said straps are secured at the same time the bottom and top members are secured together by positioning said straps between said bottom and top members when wrong side out, as shown in Fig. 1. The straps are positioned so as to extend longitudinally with and in centered relation with the slit 2a. Thus, when the powder puff is turned right side out, the straps extend along the outer side of the slit 2a, as shown in Figs. 8 and 9. The under strap forms a cover strap 8 and is secured by adhesive 7 to the top member 2. The other or outer strap forms a support 9 for the powder puff.

In the structure shown in Figs. 12 and 13, the slit 2a is not covered with an ornament or the like, but is provided with an edging 10 around its margins. This is done by a button-hole sewing machine or similar device before the bottom and top members are secured together. With this construction, the filler or padding 4 is provided with a cover or lining 11 on its side adjacent the top member 2. The lining is secured in place by adhesive 7. The slit 2a thus forms an opening to a pocket A formed between the cover or lining and the top member.

My method of forming powder puffs, in brief, is as follows:

When forming the powder puffs with ornaments, as shown in Figs. 5, 6, and 7, circular blanks are cut from suitable cloth; some of the blanks are provided with centered slits or openings. A slitted and unslitted blank are superposed with their wrong sides out. These are sewed together around their marginal portions. A circular disk of padding is placed against the exposed or wrong side of the unslitted blank. The two blanks are turned right side out which causes the padding to be within the powder puff formed by the two blanks. An ornament is then secured over the slit.

When forming the powder puff shown in Figs. 8, 9 and 10, the process is similar to the above except that the straps or ribbons are positioned between the slitted and unslitted blanks and secured therebetween, and except that the ornament is omitted and the under strap is secured over the slit while the outer strap is left free.

When forming the powder puff shown in Figs. 12 and 13, the process varies only in that the slits are provided with an edging before the blanks are sewed together; the padding is provided with a lining facing the slitted blank, and the ornament is omitted.

Though I have shown and described certain constructions, combinations and arrangements for powder puffs and disclosed certain methods of producing them, I do not wish to be limited to the described constructions, combinations and arrangements, nor to the disclosed methods, but desire to include in the scope of my invention the constructions, combinations and arrangements, and the methods, substantially as set forth in the appended claims.

Having thus described my invention, what I claim as new and desire to secure by Letters Patent is:

1. In a powder puff, a bottom member, a top member secured by its entire marginal portions to said bottom member, said top member provided with a substantially centered slit therein whereby said members may be forced through said slit and cause the adjacent or inner sides of said top and bottom to be exposed, a pair of straps secured between said bottom and top members arranged to extend over said slit, and means securing the inner one of said straps to the margins of said slit so as to close the same.

2. A method of manufacturing powder puffs consisting in cutting cloth blanks, with openings therein, then cutting other cloth blanks without openings, then superposing one type of cloth blank on the other wrong side out, then sewing the margins of said blanks together, then placing a layer of padding upon said second mentioned cloth blank, and then turning said blanks right side out through said opening while said padding remains contiguous to said second mentioned cloth blank whereby said padding is between said blanks when said blanks are right side out.

3. A method of manufacturing flexible powder puffs consisting in cutting cloth blanks, with openings therein, then cutting other cloth blanks without openings, then superposing one type of cloth blank on the other wrong side out, then sewing the margins of said blanks together, then placing a layer of padding upon said second mentioned cloth blank, and then turning said blanks right side out through said opening while said padding remains contiguous to said second mentioned cloth blank whereby said padding is between said blanks when said blanks are right side out, and then securing a flexible cover over said opening.

4. In a powder puff, a bottom member, a top member secured by its entire marginal portions to said bottom member, said top member provided with an opening therein whereby said members may be forced through said opening and cause the adjacent or inner sides of said top and bottom to be exposed, a flexible cover secured over said opening, and a pad arranged between said top and bottom members, said pad substantially filling the space between the turned in margins of said top and bottom members, whereby said pad tends to retain said powder puff in a flat condition.

5. In a powder puff, a bottom member, a top member secured by its entire marginal portions to said bottom member, said top member provided with a substantially centered slit therein, whereby said members may be forced through said slit and cause the adjacent or inner sides of said top and bottom to be exposed, a pair of straps secured between said bottom and top members arranged to extend over said slit, means securing the inner one of said straps to the margins of said slit so as to close the same, and a pad arranged between said top and bottom members, said pad substantially filling the space between the turned in margins of said top and bottom members, whereby said pad tends to retain said powder puff in a flat condition.

6. In a powder puff, a top member, a bottom member secured thereto by its entire marginal portion, a pad disposed contiguous to said bottom member, said top member provided with a substantially centered opening therein, whereby said bottom member, said pad, and said top member may be forced through said opening and cause the initially adjacent or inner sides of said top and bottom members to be exposed, said pad substantially filling the space between the turned in margins of said top and bottom members, whereby said pad tends to retain said powder puff in a flat condition, and a flexible cover secured over said opening.

7. In a powder puff, a top member, a bottom member secured thereto by its entire marginal portion, a pad disposed contiguous to said bottom member, said top member provided with a substantially centered opening therein, whereby said bottom member, said pad, and said top member may be forced through said opening and cause the initially adjacent or inner sides of said top and bottom members to be exposed, said pad substantially filling the space between the turned in margins of said top and bottom members, whereby said pad tends to retain said powder puff in a flat condition, a pair of straps secured between said top and bottom members arranged to extend over said opening, and means securing the inner one of said straps to the margins of said opening so as to close the same.

In testimony whereof, I have hereunto set my hand at San Diego, California, this 6th day of August, 1930.

ARTHUR B. CHARROIN.